Dec. 6, 1955  H. E. MARVEL  2,725,986
WATER-FUEL SEPARATOR
Filed Aug. 25, 1950  2 Sheets-Sheet 2
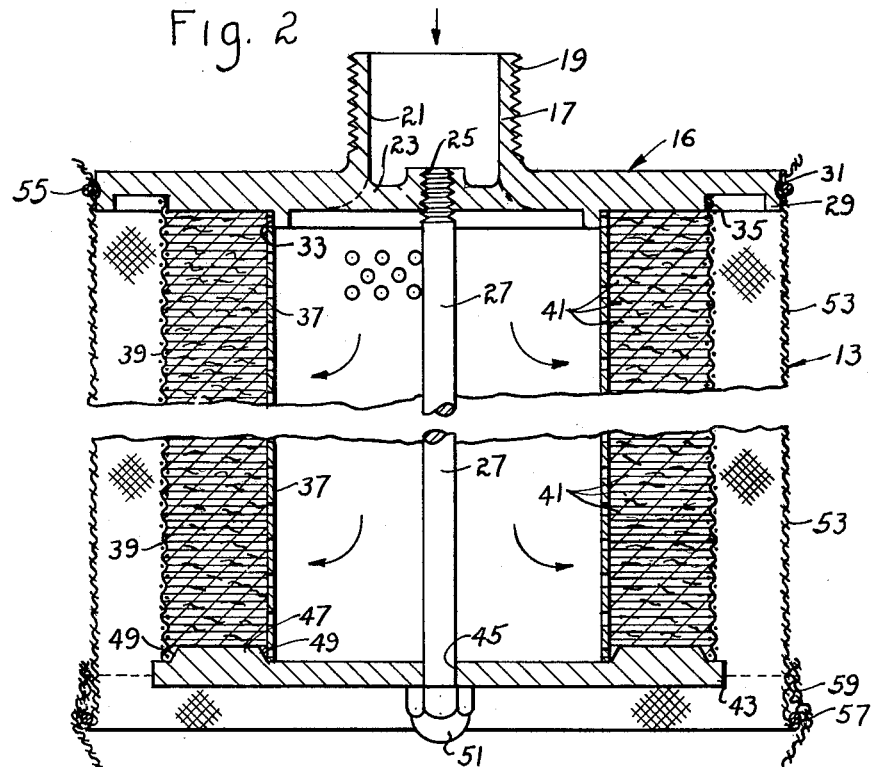
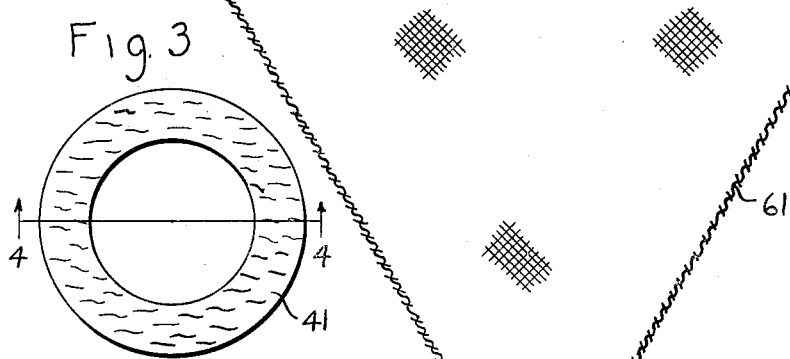
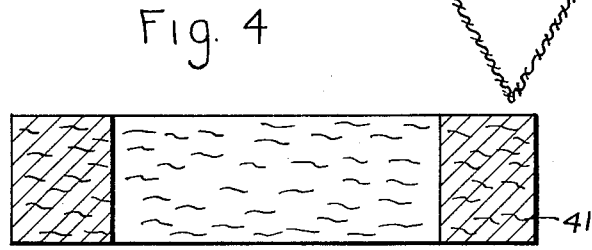
HARVEY E. MARVEL
INVENTOR.
BY Edmund W. C. Kamm
ATTORNEY

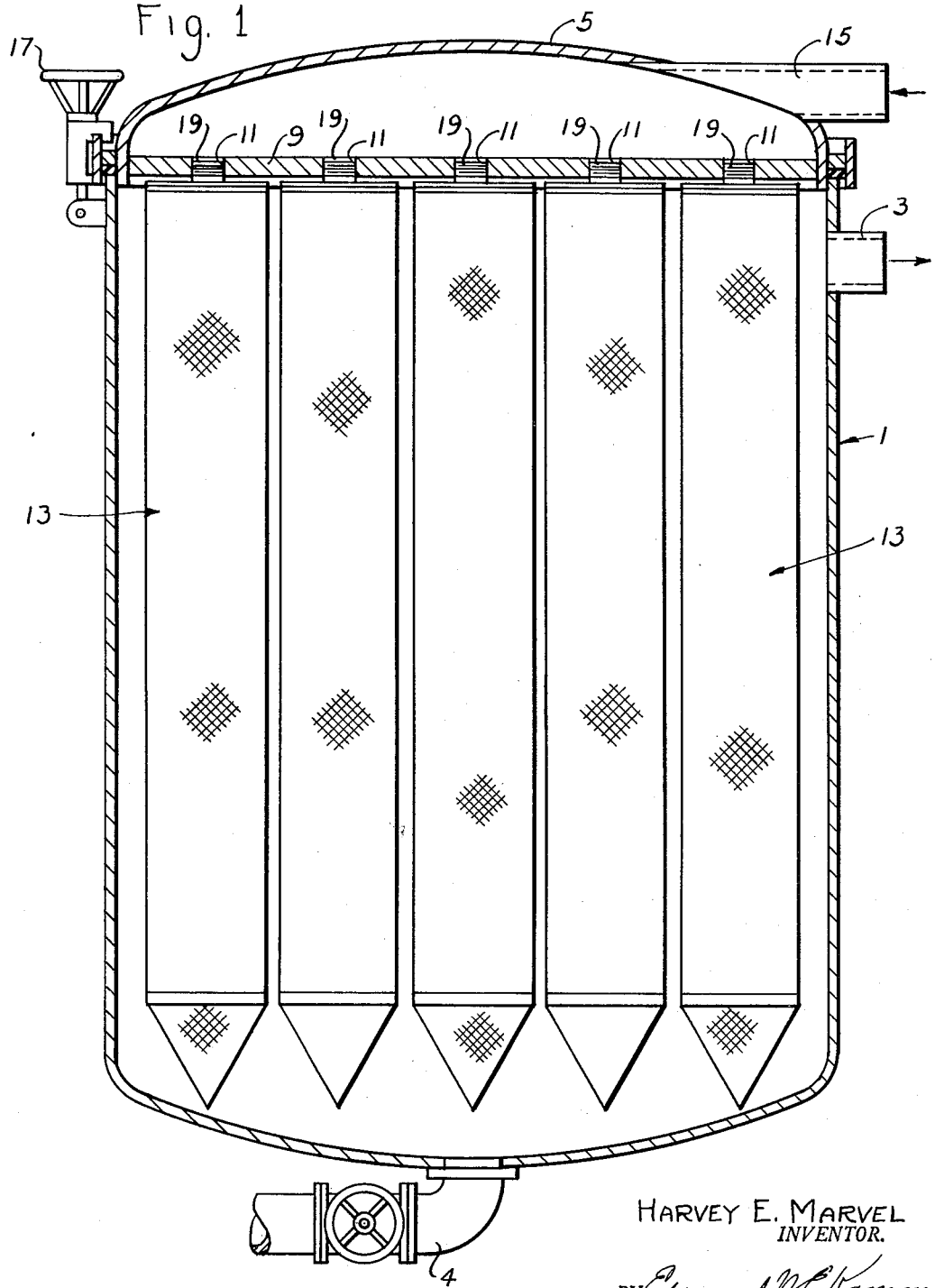

United States Patent Office 2,725,986
Patented Dec. 6, 1955

2,725,986

WATER-FUEL SEPARATOR

Harvey E. Marvel, Fort Wayne, Ind., assignor to Bowser, Inc., Fort Wayne, Ind., a corporation of Indiana Application August 25, 1950, Serial No. 181,391

13 Claims. (Cl. 210—184)

This invention relates to a separator for removing water from fuels for internal combustion engines.

The separation of water from fuels, particularly aviation gasolines has, for some time, been a problem. Fuel which has even small amounts of water entrained or otherwise contained in it is hazardous because when the temperature of the fuel is lowered, as when an airplane gains altitude, the water crystallizes out of the fuel and plugs screens, filters and other parts of the fuel system of the plane so that power plant failure and destruction of the plane may result. Numerous crashes have occurred in the past, on take off, due to ice in the fuel or due to water in sufficient quantity to starve the engine.

It is an object of this invention to provide practical means for removing water from such fuels.

Another object of the invention is to provide means for removing even small amounts of water from fuels.

A further object of the invention is to provide a structure which will effect such water removal at a relatively high rate of flow.

It is still another object of the invention to provide a separator which will coalesce the fine particles of moisture in a fuel into droplets.

Yet another object of the invention is to provide means for collecting the drops of separated water from the stream of fuel so that they may be disposed of.

It is a further object of the invention to provide a water separator which is dependable and long lived.

Another object of the invention is to direct the separated water to a point where it can be collected and eventually disposed of.

These and other objects will become apparent from a study of this specification and the drawings which are attached hereto and made a part hereof and in which:

Figure 1 is a vertical sectional view of a tank containing the separator elements.

Figure 2 is a vertical sectional view of a separator element.

Figure 3 is a plan view of a fiber glass ring such as is used in the separator element.

Figure 4 is a sectional view of the ring taken substantially on line 4—4 of Figure 3.

Referring first to Figure 1, the numeral 1 represents a tank having an outlet conduit 3, a valved water drain 4, a cover 5 which is removably held in place thereon by clamping means 17' and a deck plate 9 which sealingly engages the wall of the cover.

A number of threaded holes or ports 11 are formed in the deck plate to receive the separator cartridges, designated by numeral 13. The inlet conduit 15 is a part of the cover.

Referring now to Figure 2, the separator cartridge 13 comprises a head 16 having an inlet neck 17 which is exteriorly threaded at 19 to fit in the holes 11 and thus provide an inlet channel 21 to the interior of the separator.

A bar 23 extends across, but does not close the channel, and carries a centrally tapped boss 25 which supports the upper end of a tie rod 27.

The bottom of the head is provided with an axially, downwardly extending, peripheral flange 29 which has a circumferential groove 31 formed therein.

The bottom is also formed with two circular steps or hubs 33 and 35 which are substantially concentric with the flange 29 and channel 21. A cylindrical, perforated tube 37 has its end fitted over the hub 33 and a cylindrical screen 39 has its end fitted over the hub 35.

A plurality of annular laminae 41 of fiber glass, which are described more fully below, are packed and compressed in the annular space between the tube and screen. A bottom head 43 has a hole 45 therein to receive the tie rod 27 and has an annular ring 47 on the face thereof. The radial corners of the ring are preferably chamfered heavily at 49. The width and diameter of the ring are such that the ring fits in the annular space between the tube and screen. Thus when the lower head is mounted on the tie rod and the nut 51 on the tie rod is drawn up, the ring will compress the pads axially into the space and will also support the screen and tube radially.

A cylindrical cloth tube 53, made preferably of linen, is slipped over the flange 29 and a wire or other tie 55 is applied over the tube at the groove 31 to hold the tube in place on the flange. A linen of about 34 x 40 mesh is preferred.

The tube is preferably provided with a circular wire 57, held in a hem 59, to hold the lower end of the tube against collapse. A cone 61 also of linen cloth is sewn at its base to the cloth tube and has its apex depending.

If desired, the weave of the cloth of the cone may be finer than that of the cylinder for a purpose to be described. I prefer to use a handkerchief linen of about 60 x 66 mesh for the cone.

Referring now to Figures 3 and 4, the annular laminae 41 are made from a pad of fiber glass. The fibers are preferably bonded with a phenol formaldehyde resin. I prefer to use a pad having a thickness of about one inch and weighing approximately one half pound a square yard. The general direction of the fibers is substantially horizontal in this pad and the annular elements are cut from the pad by a vertically moving tool so that the fibers are disposed substantially transversely of the element.

The elements are then piled in the space between the tube and screen and compressed therein until they have a thickness of about five hundredths of an inch.

*Operation*

The fuel containing water which is so finely divided that it appears milky or cloudy in a glass, is forced under pressure into the inlet 15 of the tank 1 so that it will pass down through the conduit 21 in head 16 into the separator cartridge 13, radially outwardly through the tube 37, the compressed annular elements 41 and the screen 39 into the space between the screen and the linen bag.

The water is separated from the fuel and coalesces into relatively large drops which tend to settle in the space. However, the fuel is flowing at a considerable velocity so that the drops tend to be carried along with the stream of fuel until they contact the linen tube where they tend to merge and follow down the inside wall of the tube into the cone. The latter is preferably made of a finer material than the cloth tube so that water will collect in the apex of the cone from which it will flow as a stream, through the relatively quiescent body of fuel into the bottom of the tank where it will collect and can be drawn off through drain 4 or by any other suitable means.

The water free fuel passes through the linen tube 53 into the tank and is discharged through the outlet 3.

I have found that it is highly advantageous to pass the fuel and water mixture in directions parallel to the general run of fibers rather than transversely thereof, as for instance, from face to face of the pad. A much greater flow rate is obtained for a given differential pressure and the water removal function is not materially affected.

I have also found that the resin bonded fiber glass has distinct advantages over plain, unbonded fiber glass. It is more stable and more easy to work and handle.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. A water-fuel separator comprising a tank having inlet and outlet conduits, a fuel outlet connected to the upper portion of said tank and a water outlet connected to the bottom portion of said tank, a deck plate disposed substantially horizontally in said tank to prevent communication between said conduits, means defining a port in the plate, a water and fuel separating cartridge connected to the plate and having an inlet communicating with said port, said cartridge comprising resin-bonded fibrous filter material disposed in the path of the mixture of water and fuel flowing from said inlet for coalescing the particles of water in the fuel into drops as the same pass therethrough and straining means disposed externally of said cartridge to receive the mixture of fuel and water drops issuing from said separating cartridge for retaining the water drops but passing the fuel.

2. A water-fuel separator comprising a tank having inlet and outlet conduits, a fuel outlet connected to the upper portion of said tank and a water outlet connected to the bottom portion of said tank, a deck plate disposed substantially horizontally in said tank to prevent communication between said conduits, means defining a port in the plate, a water and fuel separating cartridge disposed in the tank, connected to the plate and having an inlet communcating with the discharge side of said port, said cartridge comprising a compressed, bonded fiber glass pack for coalescing the particles of water in the fuel into drops as the same pass therethrough and straining means disposed externally of said cartridge to receive the mixture of fuel and water drops issuing from said separating cartridge for retaining the water drops but passing the fuel.

3. A water-fuel separator comprising a tank having inlet and outlet conduits, a fuel outlet connected to the upper portion of said tank and a water outlet connected to the bottom portion of said tank, a deck plate disposed substantially horizontally in said tank to prevent communication between said conduits, means defining a port in the plate, a water and fuel separating cartridge connected to the plate and having an inlet communicating with said port, said cartridge comprising resin-bonded fibrous filter material for coalescing the particles of water in the fuel into drops as the same pass therethrough and straining means disposed externally of said cartridge to receive the mixture of fuel and water drops for retaining the water drops but passing the fuel, said straining means comprising a bag surrounding but spaced from the coalescing means and terminating adjacent the bottom of said tank.

4. A water-fuel separator comprising a tank having inlet and outlet conduits, a fuel outlet connected to the upper portion of said tank and a water outlet connected to the bottom portion of said tank, a deck plate disposed substantially horizontally in said tank to prevent communication between said conduits, means defining a port in the plate, a water and fuel separating cartridge connected to the plate and having an inlet communicating with said port, said cartridge comprising resin-bonded fibrous filter material for coalescing the particles of water in the fuel into drops as the same pass therethrough and straining means disposed externally of said cartridge to receive the mixture of fuel and water drops for retaining the water drops but passing the fuel, said straining means comprising a linen bag surrounding but spaced from the coalescing means and terminating in a depending converging tip portion, adjacent the bottom of said tank.

5. A water-fuel separator comprising a tank having inlet and outlet conduits, a fuel outlet connected to the upper portion of said tank and a water outlet connected to the bottom portion of said tank, a deck plate disposed substantially horizontally in said tank to prevent communication between said conduits, means defining a port in the plate, a water and fuel separating cartridge connected to the plate and having an inlet communicating with said port, said cartridge comprising compressed, phenol formaldehyde resin bonded fiber glass filter material for coalescing the particles of water in the fuel into drops as the same pass therethrough and straining means disposed externally of said cartridge to receive the mixture of fuel and water drops for retaining the water drops but passing the fuel.

6. A water and fuel separator cartridge comprising a head, an inlet conduit therein, a plurality of annular, resin bonded fiber glass laminae, means for supporting said laminae in compressed, coaxial, stacked relation on said head with the openings in communication with said conduit, a linen bag having an open end, means for supporting one end of said bag on the head, to enclose said laminae but in spaced relation thereto, the opposite, closed end of the bag being formed to converge away from said head toward a single point.

7. A water and fuel separator cartridge comprising a head, an inlet conduit therein, a plurality of annular, resin bonded fiber glass laminae, means for supporting said laminae in compressed, coaxial, stacked relation on said head with the openings in communication with said conduit, a cloth bag having an open end, means for supporting one end of said bag on the head, to enclose said laminae but in spaced relation thereto, the opposite, closed end of the bag being formed to converge toward a single point and a hoop attached to said bag adjacent the base of said converging end.

8. A water and fuel separator cartridge comprising a head, an inlet conduit therein, a plurality of annular, phenol formaldehyde resin bonded fiber glass laminae, means for supporting said laminae in compressed, coaxial, stacked relation on said head with the openings in communication with said conduit, a cloth bag having an open end, means for supporting one end of said bag on the head, to enclose said laminae but in spaced relation thereto, the opposite, closed end of the bag being formed to converge toward a single point, said converging end of the bag being formed of a cloth having a weave which is close enough to restrain the water collected therein except adjacent the point of convergence.

9. In a water and fuel separator for removing water from liquid fuels containing water and comprising a container having an inlet chamber and an outlet chamber through which said fuel flows, cartridge means arranged in said container between said inlet chamber and said outlet chamber and through which said liquid fuel containing water is passed to strip the water therefrom, said cartridge comprising an inlet conduit communicating with said inlet chamber of the container, a pad of glass fibers bonded together in a substantially free state and subsequently compressed with a number of similar pads into said cartridge, top and bottom wall means retaining said pads of glass fibers in place, said fiber glass when compressed forming a compact porous mass, said pads of glass fibers being arranged in the cartridge so that fuel and water mixture flows from said inlet chamber and through said pad of glass fibers substantially parallel to the general run of the fibers, and an outer perforated wall means for enclosing said pads of glass fibers.

10. In a water and fuel separator for removing water from liquid fuels containing water, as in claim 9, and comprising a container having an inlet and outlet opening, a cartridge for arrangement in said container between the inlet and outlet opening thereof and through which said cartridge comprising an inlet conduit communicating with the inlet side of said container, a pad of glass fibers bonded together in a substantially free state and subsequently compressed with other similar pads into said cartridge through which said liquid fuel is adapted to flow and strip the water therefrom, said fiber glass being bonded with phenol formaldehyde resin, said cartridge forming a compact porous mass through which the fuel and water mixture is passed to strip the water therefrom.

11. In a water and fuel separator for stripping water from liquid fuels containing the same, a cartridge comprising an inlet conduit, a mass of fiber glass bonded together in a substantially free state, and means for supporting said mass in the path of liquid flowing from said conduit, said mass of fiber glass in the free state being bonded with resin and compressed to approximately $\frac{1}{20}$ of its free thickness.

12. In a water and fuel separator for stripping water from liquid fuels containing the same, a cartridge comprising an inlet conduit, a mass of resin-bonded fiber glass laminae, means for supporting said laminae edgewise in the path of liquid flowing therethrough, said resin-bonded fiber glass laminae being compressed to approximately $\frac{1}{20}$ of its free thickness.

13. In a water and fuel separator for stripping water from liquid fuels containing the same, a cartridge comprising an inlet conduit, a hollow mass of resin-bonded fiber glass and means for supporting said mass with its interior in position to receive the liquid flowing from said conduit, said resin-bonded fiber glass being compressed to approximately $\frac{1}{20}$ of its free thickness, a strainer disposed around said cartridge, means for supporting said strainer exteriorly of the mass to receive the effluent from said mass for collecting the separated water, said strainer extending below said mass to conduct said water downwardly and out of the stream of effluent from the mass.

References Cited in the file of this patent

UNITED STATES PATENTS

| | | |
|---|---|---|
| 987,114 | Cottrell | Mar. 21, 1911 |
| 994,377 | Cottrell | June 6, 1911 |
| 1,179,157 | Braun | Apr. 11, 1916 |
| 1,218,738 | Zahm | Mar. 13, 1917 |
| 1,642,864 | Williams | Sept. 20, 1927 |
| 1,787,577 | Hills | Jan. 6, 1931 |
| 1,823,171 | Hele-Shaw et al. | Sept. 15, 1931 |
| 1,947,709 | Garrison et al. | Feb. 20, 1934 |
| 1,974,235 | Cammen | Sept. 18, 1934 |
| 2,103,572 | Wells | Dec. 28, 1937 |
| 2,196,821 | Arnold | Apr. 9, 1940 |
| 2,334,263 | Hartwell | Nov. 16, 1943 |
| 2,359,386 | Reinsch | Oct. 3, 1944 |
| 2,412,841 | Spangler | Dec. 17, 1946 |

FOREIGN PATENTS

| | | |
|---|---|---|
| 425,409 | Great Britain | Mar. 7, 1935 |
| 492,956 | Great Britain | Sept. 26, 1928 |